(12) United States Patent
Mauer (10) Patent No.: US 10,361,548 B2
(45) Date of Patent: Jul. 23, 2019

(54) DIVIDED JUNCTION BOX

(71) Applicant: Siemens Schweiz AG, Zurich (CH)

(72) Inventor: Alexander Mauer, Wiesent (DE)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 15/408,448

(22) Filed: Jan. 18, 2017

(65) Prior Publication Data

US 2018/0205211 A1 Jul. 19, 2018

(51) Int. Cl.
*H02G 3/08* (2006.01)
*H02G 3/16* (2006.01)

(52) U.S. Cl.
CPC .............. *H02G 3/16* (2013.01); *H02G 3/086* (2013.01)

(58) Field of Classification Search
CPC .............. H02G 3/16; H02G 3/08; H02G 3/086
See application file for complete search history.

(56) References Cited

U.S. PATENT DOCUMENTS

| | | | | |
|---|---|---|---|---|
| 3,587,906 A * | 6/1971 | Pepe | ...................... | H02G 3/081 174/53 |
| 4,455,449 A * | 6/1984 | Rendel | ...................... | H02G 3/16 174/53 |
| 5,257,487 A * | 11/1993 | Bantz | ...................... | H02G 3/283 174/486 |
| 5,486,650 A * | 1/1996 | Yetter | ...................... | H02G 3/10 174/53 |
| 5,594,207 A * | 1/1997 | Fabian | ................... | H02G 3/086 174/53 |
| 6,005,187 A * | 12/1999 | Navazo | ................... | H02G 3/128 174/481 |
| 6,268,564 B1 * | 7/2001 | Miyakoshi | ........... | H01R 13/518 174/50 |
| 6,274,809 B1 * | 8/2001 | Pudims | ................... | H02G 3/185 174/486 |
| 6,395,981 B1 * | 5/2002 | Ford | ....................... | H02G 3/086 174/499 |

(Continued)

FOREIGN PATENT DOCUMENTS

CA 2133381 C 4/2005 ............... H02G 3/10

OTHER PUBLICATIONS

Canadian Office Action, Application No. 2992077, 4 pages, dated Oct. 2, 2018.

*Primary Examiner* — Timothy J Thompson
*Assistant Examiner* — Rhadames Alonzo Miller
(74) *Attorney, Agent, or Firm* — Slayden Grubert Beard PLLC (57) ABSTRACT

The present disclosure relates to wiring systems and the teachings thereof may be embodied in a junction box and/or electrical wiring components. Some embodiments may include a divider for use with a junction box in circuit wiring. The divider may include: a wall extending from one corner of a container of the junction box diagonally to an opposite corner of the container and a fitting for a connecting module having terminals on both a first side and a second side of the connecting module. The first side of the connecting module may extend into a first section of the container and the second side of the connecting module into the second section of the container. The wall may separate two generally triangular sections of the container.

13 Claims, 8 Drawing Sheets

(56) References Cited

U.S. PATENT DOCUMENTS

| | | | | |
|---|---|---|---|---|
| 6,653,561 | B2* | 11/2003 | Lalancette | H02G 3/081 174/50 |
| 7,825,336 | B2* | 11/2010 | Peck | H01R 13/514 174/50 |
| 7,910,826 | B1* | 3/2011 | Shotey | H02G 3/126 174/50 |
| 7,989,710 | B2* | 8/2011 | Hansen | H02G 3/185 174/482 |
| 8,016,149 | B2* | 9/2011 | Goulet | H02G 3/081 220/241 |
| 8,378,232 | B2* | 2/2013 | Drane | H02G 3/185 174/482 |
| 8,878,058 | B2* | 11/2014 | Wurms | H02G 3/08 174/482 |
| 2011/0209913 | A1* | 9/2011 | Green | H02G 3/081 174/520 |
| 2013/0319715 | A1* | 12/2013 | Korcz | H02G 3/14 174/50 |

* cited by examiner

DIVIDED JUNCTION BOX

TECHNICAL FIELD

The present disclosure relates to wiring systems and the teachings thereof may be embodied in a divided junction box and/or a divider for wiring a junction box.

BACKGROUND

An electrical junction box provides a connection point for electrical wiring and/or conduits. Electrical conduits typically terminate at the sides of the junction box and cables and/or wires pass through the sidewalls to the interior. Inside the junction box, the cables and/or wires may be connected to other wires and/or pass through. The junction box may provide access, protection, and structural support for the electrical system.

The National Electric Code (NEC) is a North American standard for installation of electric conductors within or on buildings. The NEC defines Class 2 circuits with limited maximum voltage and current in comparison to mains electricity (or "line power") delivered to buildings and used for general applications. The Class limits allow reduced requirements for wire size, derating factors, overcurrent protection, insulation, wiring methods, installation materials, etc. Using Class 2 circuits may reduce costs and improve flexibility.

In exchange for these benefits, the NEC requires Class 2 circuits must be used only for dry, indoor circuits, cannot be used in hazardous locations, must be grounded, and must be separated from other circuits. Compliance with these requirements may add components and/or complexity, especially if mains electricity is used in the same rooms or buildings. For example, the KNX standard widely used in Europe for network communications protocol for building automation does not separate line power from Class 2 circuits as required by the NEC, so multiple circuits may be required to implement such building automation solutions in North America.

SUMMARY

The teachings of the present disclosure may be embodied in a junction box and/or electrical wiring components. Some embodiments may include a divider for use with a junction box in circuit wiring. The divider may include: a wall extending from one corner of a container of the junction box diagonally to an opposite corner of the container and a fitting for a connecting module having terminals on both a first side and a second side of the connecting module. The first side of the connecting module may extend into a first section of the container and the second side of the connecting module into the second section of the container. The wall may separate two generally triangular sections of the container.

In some embodiments, the wall has a height matching a depth of the container.

In some embodiments, the wall includes beveled ends fitting inside the corners of the container.

In some embodiments, the fitting comprises: a groove guiding the connecting module into a position; a stop defining the position of the connecting module; and a detent retaining the connecting module in the position once inserted.

In some embodiments, the wall has an adjustable length.

In some embodiments, the wall comprises: a primary section including the fitting; an extendable secondary section movable in relation to the primary section; and a mechanism to fix a length of the wall by retaining the extendable secondary section in a fixed position in relation to the primary section.

In some embodiments, the mechanism comprises: a set of detents on one of the sections of the wall; and a tooth on the opposite section of the wall, configured to fit with the set of detents to fix the length of the wall.

Some embodiments may include an insert for a junction box. The insert may include a connecting module with terminals for a Class 2 circuit on a first side and for a line voltage circuit on a second side and a divider comprising: a wall extending from one corner of a container of the junction box diagonally to an opposite corner of the container, the wall separating two generally triangular sections of the container and a fitting for the module. The first side of the connecting module may extend into a first section of the container and the second side of the connecting module into the second section of the container.

In some embodiments, the wall has a height matching a depth of the container.

In some embodiments, the wall includes beveled ends fitting inside the corners of the container.

In some embodiments, the fitting comprises: a groove guiding the module into a position; a stop defining the position of the module; and a detent retaining the module in the position once inserted.

In some embodiments, the wall has an adjustable length.

In some embodiments, the wall comprises: a primary section including the fitting; an extendable secondary section movable in relation to the primary section; and a mechanism to fix a length of the wall by retaining the extendable secondary section in a fixed position in relation to the primary section.

In some embodiments, the mechanism comprises: a set of detents on one of the sections of the wall; and a tooth on the opposite section of the wall, configured to fit with the set of detents to fix the length of the wall.

In some embodiments, the Class 2 circuit complies with the KNX standard network communications protocol.

Some embodiments may include a junction box for electrical circuits. The junction box may include: a container with multiple mounts for electrical conduit or wiring and a connecting module with terminals for a Class 2 circuit on a first side and for a line voltage circuit on a second side. The connecting module may be mounted into a divider comprising: a wall extending from one corner of the container diagonally to an opposite corner of the container, the wall defining two generally triangular sections of the container and a fitting for the module. The first side of the connecting module may extend into a first section of the container and the second side of the connecting module into the second section of the container.

In some embodiments, the wall has a height matching a depth of the container.

In some embodiments, the fitting comprises: a groove guiding the connecting module into a position; a stop defining the position of the connecting module; and a detent retaining the connecting module in the position once inserted.

In some embodiments, the Class 2 circuit complies with the KNX standard network communications protocol.

BRIEF DESCRIPTION OF THE DRAWINGS

Example aspects and embodiments of the teachings of the present disclosure are explained in more detail below with reference to the drawings, wherein.

DETAILED DESCRIPTION

In currently accepted European wiring standards, e.g., the KNX protocol, various connection modules may include both line voltage and Class 2 terminals in a single module. These connection modules, however, cannot be mounted in a standard North American junction box without running afoul of requirements of the NEC, e.g., that Class 2 circuits must be isolated from line voltage circuits. Various solutions employed in the art may include mounting connection modules to the outside of a junction box so that only one class of circuit passes into the box. Such solutions may require multiple junction boxes and/or non-standard boxes.

Various embodiments of the present disclosure may provide a standard junction box for connecting line voltage circuits and Class 2 circuits without violating the NEC. In some embodiments, a divider may separate a standard 4"×4" metal or plastic junction box into two zones, one for each class of circuit, without requiring additional boxes, connections external to the box, or other alternative solutions requiring more space, duplicate and/or non-standard components.

Figure 1A:
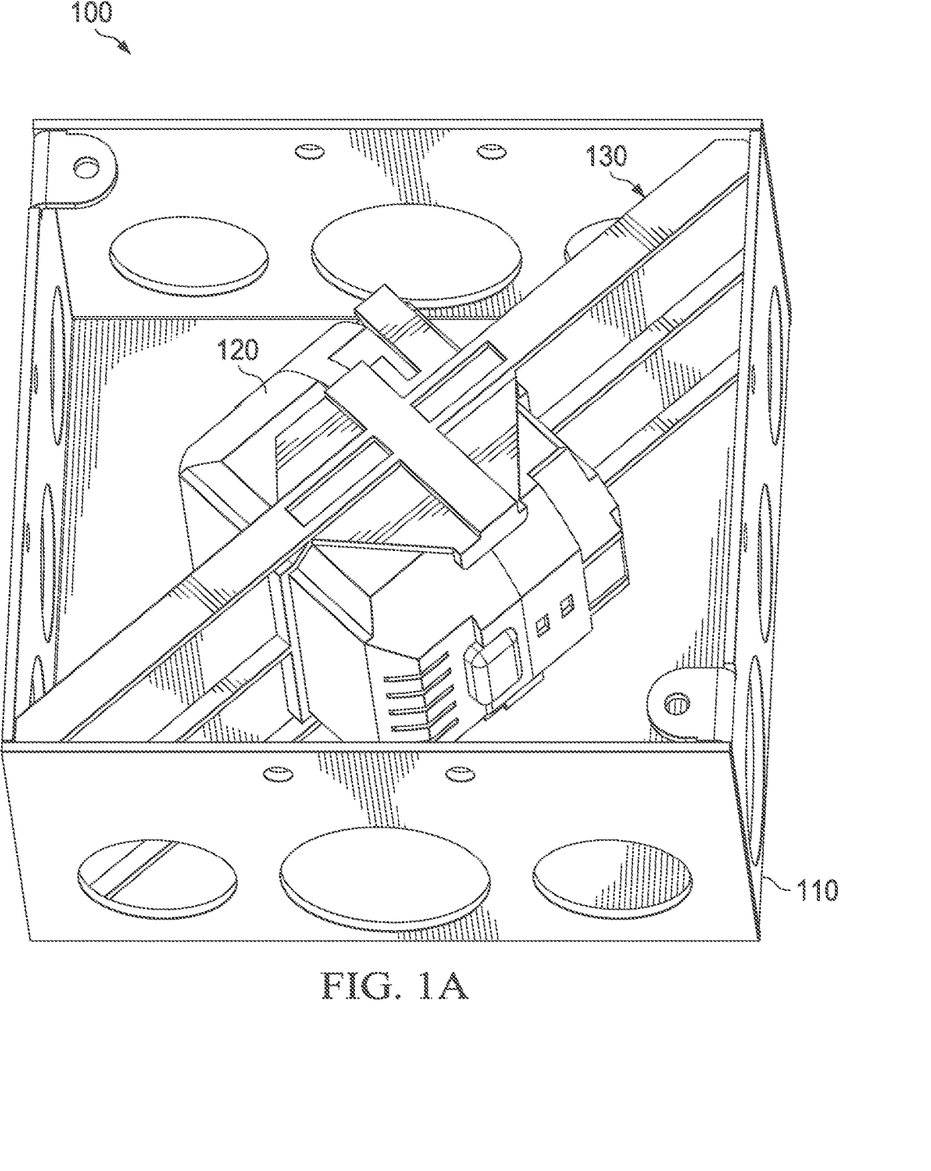
FIGS. 1A and 1B are schematic drawings showing an example junction box and connecting module incorporating teachings of the present disclosure.
Figure 1B:
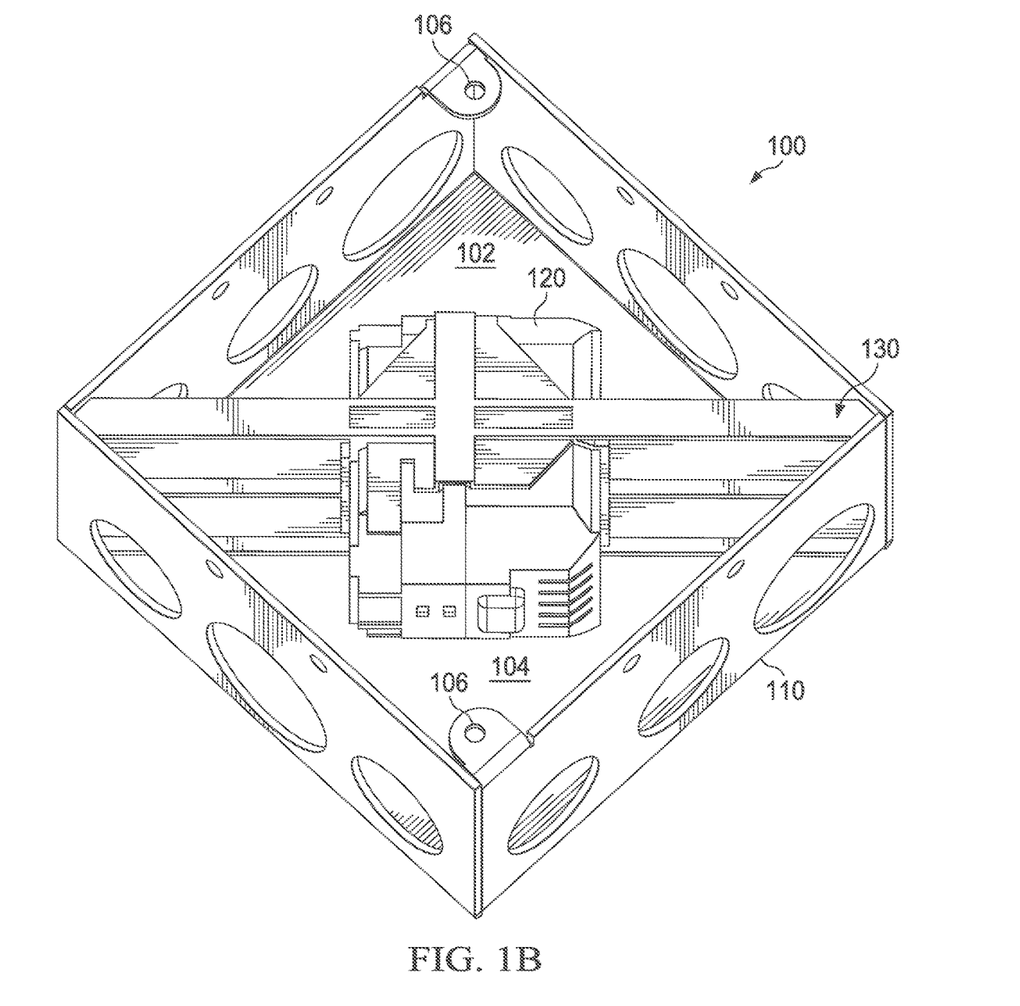

FIGS. 1A and 1B are schematic drawings showing an example junction box 100 and connecting module 120 incorporating teachings of the present disclosure. Junction box 100 may include a container 110 divided into sections by a divider 130. Divider 130 may comprise a wall extending from one corner of the container 110 diagonally to an opposite corner of the container 110 and a fitting for the connecting module 120.

In the example shown in FIG. 1B, the wall separates two sections 102, 104 of the container 110. In some embodiments, a first generally triangular section 102 may be used for Class 2 circuits as defined by the NEC. In some embodiments, a second generally triangular section 104 may be used for line voltage circuits. In some embodiments, however, the sections have non-triangular shapes. In some embodiments, the first and second section of the container 110 may be used for circuits of any appropriate power level.

As shown in FIGS. 1A and 1B, when connecting module 120 is in place within the fitting provided by divider 130, a first side of the connecting module 120 extends into the first section 102 of the container 110 and the second side of the connecting module 120 extends into the second section of the container 110. If the two sides of connecting module 120 extend into separated sections 102,104 of container 110, the installation of connecting module 120 may comply with the NEC even though a Class 2 circuit is in the same junction box 100 as a line voltage circuit.

As shown in FIGS. 1A and 1B, container 110 may define holes along one or more sidewalls to provide mounts for electrical conduit and/or wiring. In addition, container 110 may include holes 106. Holes 106 may provide mounts for a cover plate (not shown for the sake of clarity). Divider 130 may have a height generally equal to the depth of container 110. In such embodiments, installing a cover plate will serve as a retainer for divider 130 within the container 110.

Figure 2:
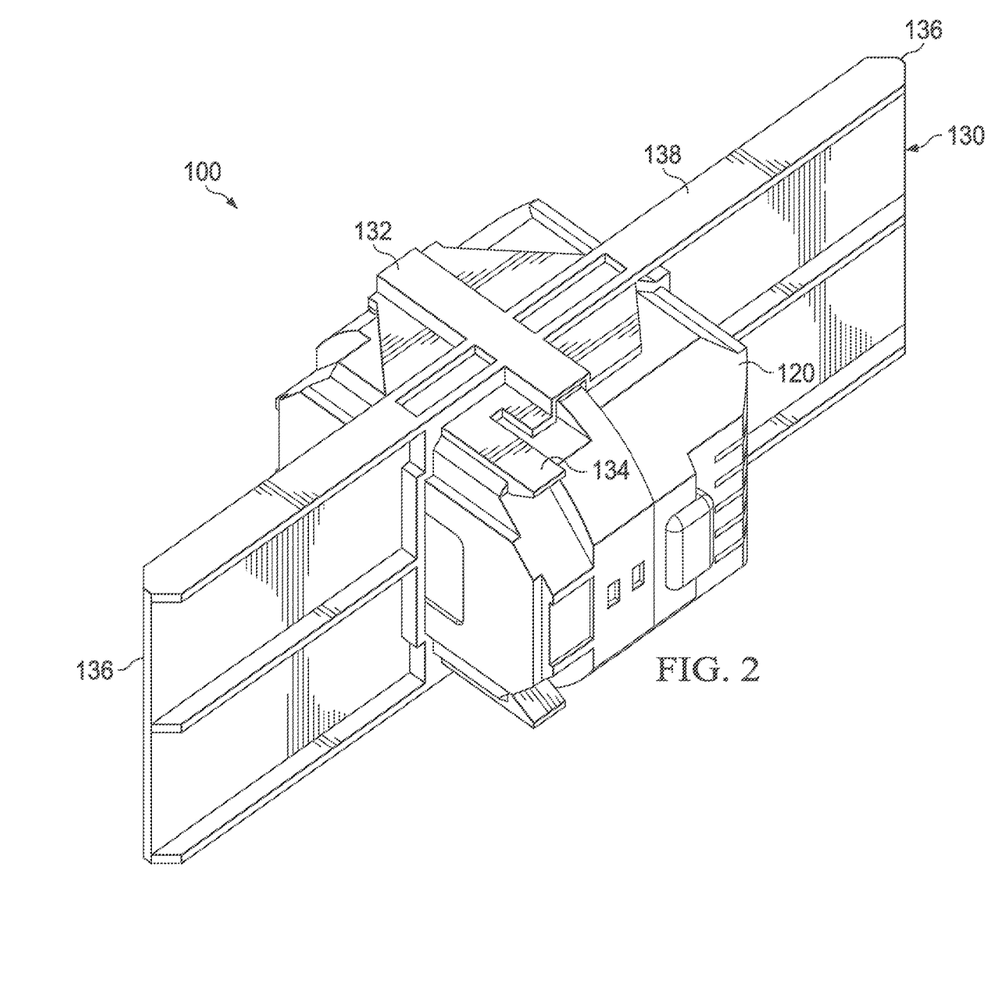
FIG. 2 is a schematic drawing showing a perspective view of an example divider with a connecting module mounted therein, according to teachings of the present disclosure.

FIG. 2 is a schematic drawing showing a perspective view of an example divider 130 with a connecting module 120 mounted therein, according to teachings of the present disclosure. As shown, divider 130 is not currently mounted in a container 110 and/or junction box, but is configured for mounting therein. Divider 130 may include a wall 138 extending along a longitudinal axis. The thickness of wall 138 may be defined by one or more requirements of various electrical codes, including air and creepage distances (e.g., NEC requirements for the distance between line voltage and Class 2 voltage circuits).

As shown, wall 138 may include ribs, ridges, and/or additional features to provide rigidity and/or other structural characteristics. For example, at either end 136 of wall 138, divider 130 may include angled or beveled ends 136 to mate with container 110. Angled ends 136 may allow adjustment and/or movement of divider 130 without permitting electrical circuits or wires to be routed around the end of divider 130.

Connecting module 120 may be mounted to divider 130 in a fitting 132 defined by various features and/or components of divider 130. For example, as shown in FIG. 2, connecting module 120 may be held in place and/or retained by detents 134. Detents 134 may include any components and/or physical features allowing movement into fitting 132 but resisting movement out of fitting 132 once inserted. As shown in FIG. 2, detents 134 may include a snap-lock or snap-fit.

Figure 3:
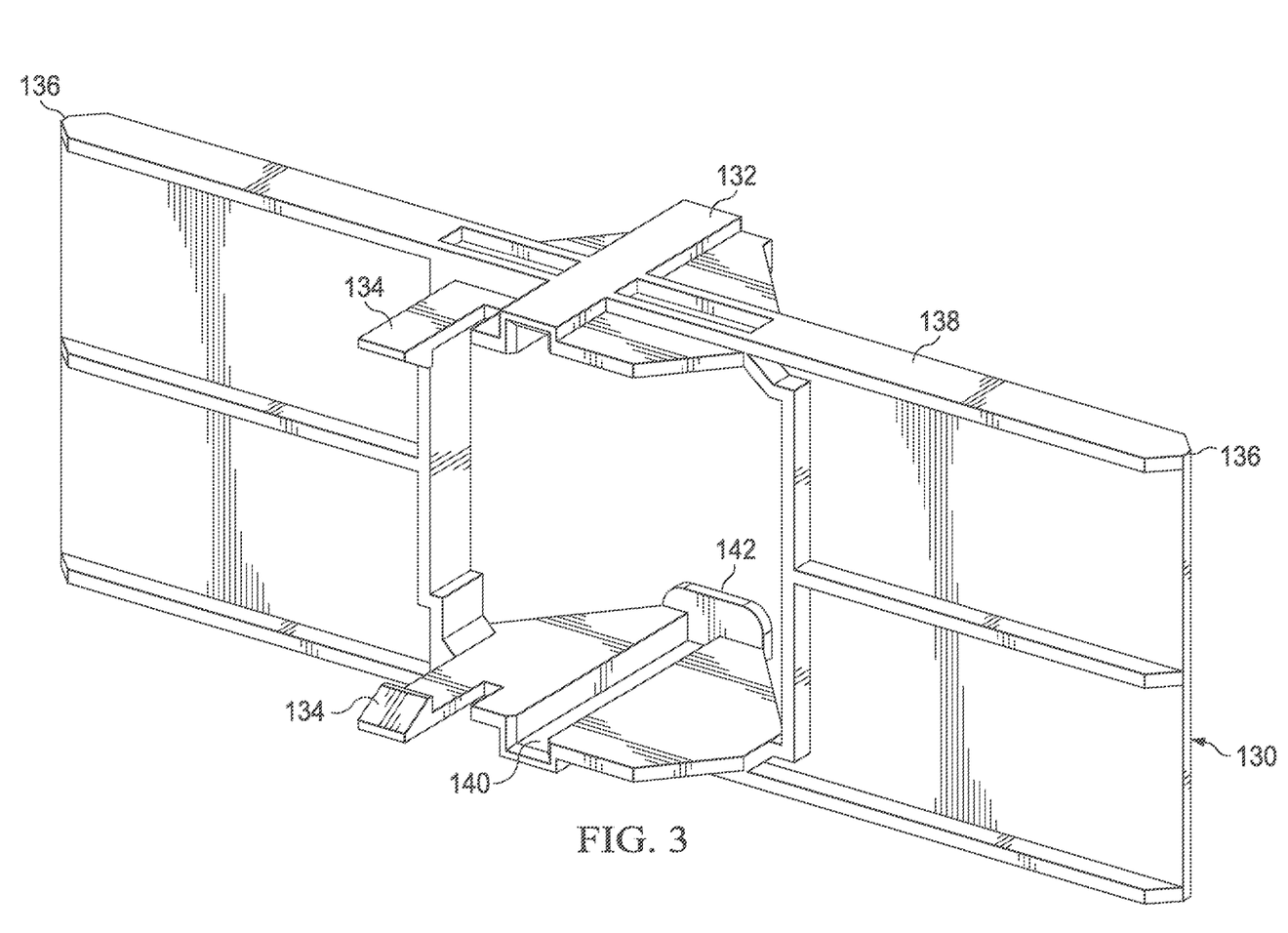
FIG. 3 is a schematic drawing showing the example divider of FIG. 2 with the connecting module removed for clarity.

FIG. 3 is a schematic drawing showing the example divider 130 of FIG. 2 with the connecting module 120 removed for clarity. As shown in FIG. 3, fitting 132 may include various features and/or components adapted to a particular connecting module 120. For example, fitting 132 may include detents 134 as discussed above as well as a groove 140 configured to interact with a feature on the outside of connecting module 120. Connecting module 120 can slide into groove 140 until it reaches the stops 142 which resist further movement. Once connecting module 120 reaches the stops 142, detents 134 are in position to snap back around connecting module 120 and thereby hold it fast against stops 142.

Figure 4A:
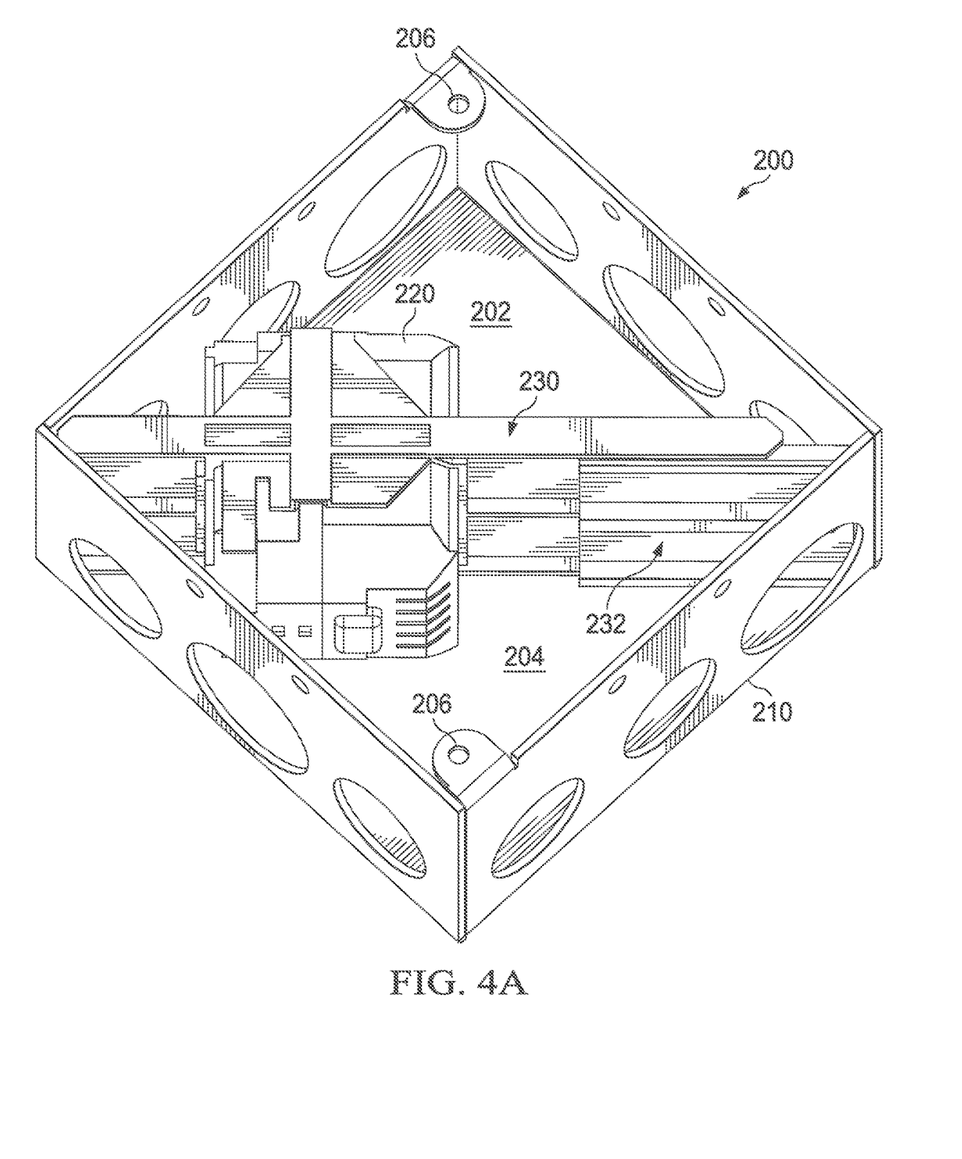
FIGS. 4A and 4B are schematic drawings showing an example junction box and connecting module with adjustable length incorporating teachings of the present disclosure.
Figure 4B:
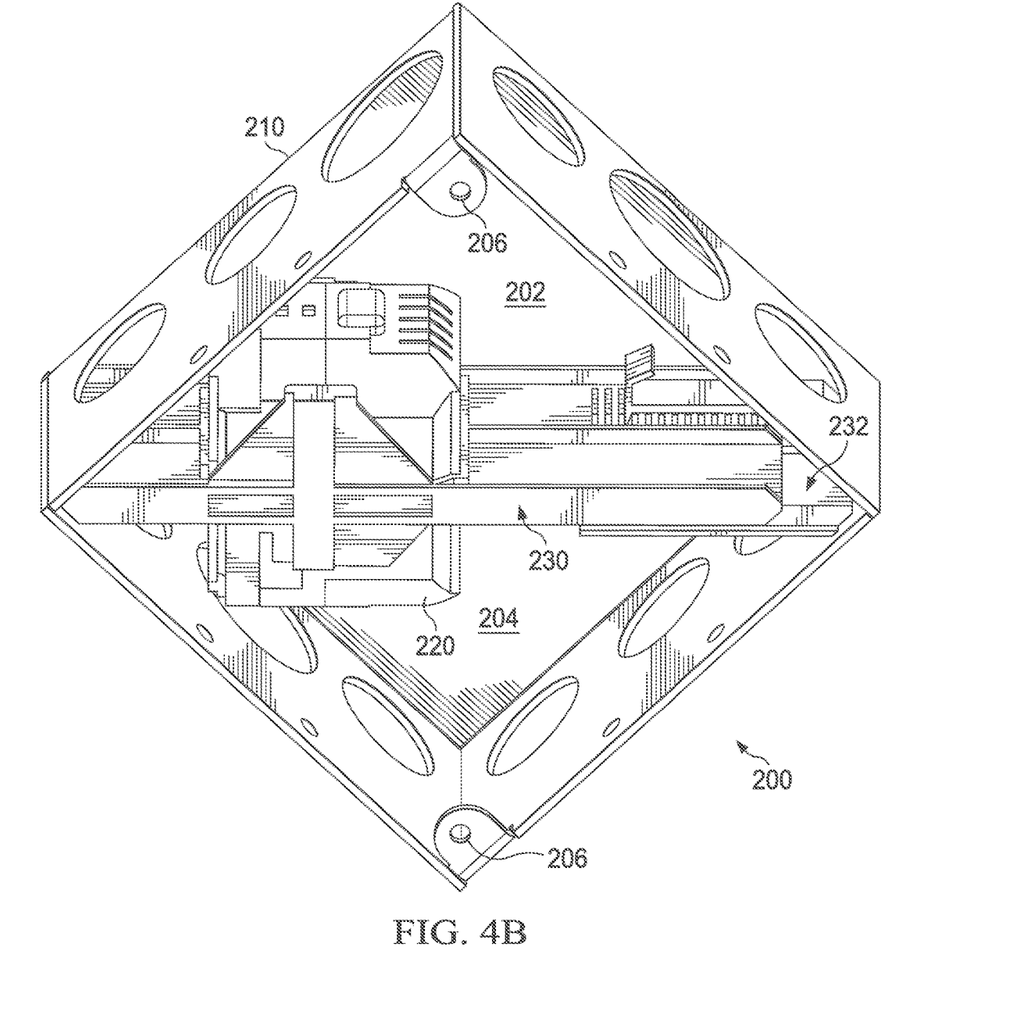

FIGS. 4A and 4B are schematic drawings showing an example junction box 200 and connecting module 220 mounted in divider 230 incorporating teachings of the present disclosure. As shown in FIGS. 4A and 4B, divider 230 includes a wall having an adjustable length. Divider 230 may be useful for container 210 of irregular size and/or shape. In some embodiments, divider 230 may be adjustable to fit a variety of containers 210.

As shown in FIGS. 4A and 4B, the wall includes a primary section including the fitting for connecting module 220 and an extendable secondary section 232 movable in relation to the primary section. Further, divider 230 may include a mechanism to fix the length of the wall by retaining the extendable secondary section 232 in a fixed position in relation to the primary section.

Figure 5:
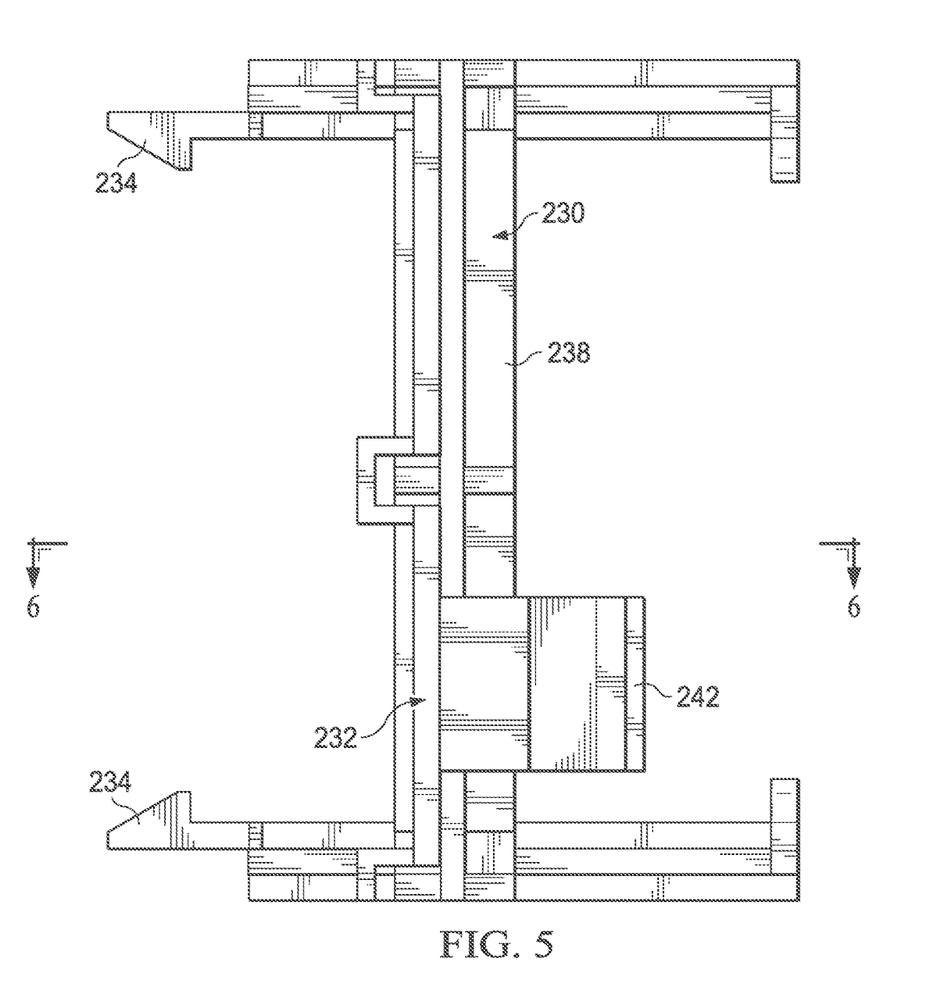
FIGS. 5 and 6 are drawings showing an enlarged view of an example mechanism to fix an adjustable length of a wall of an example divider, according to teachings of the present disclosure.
Figure 6:
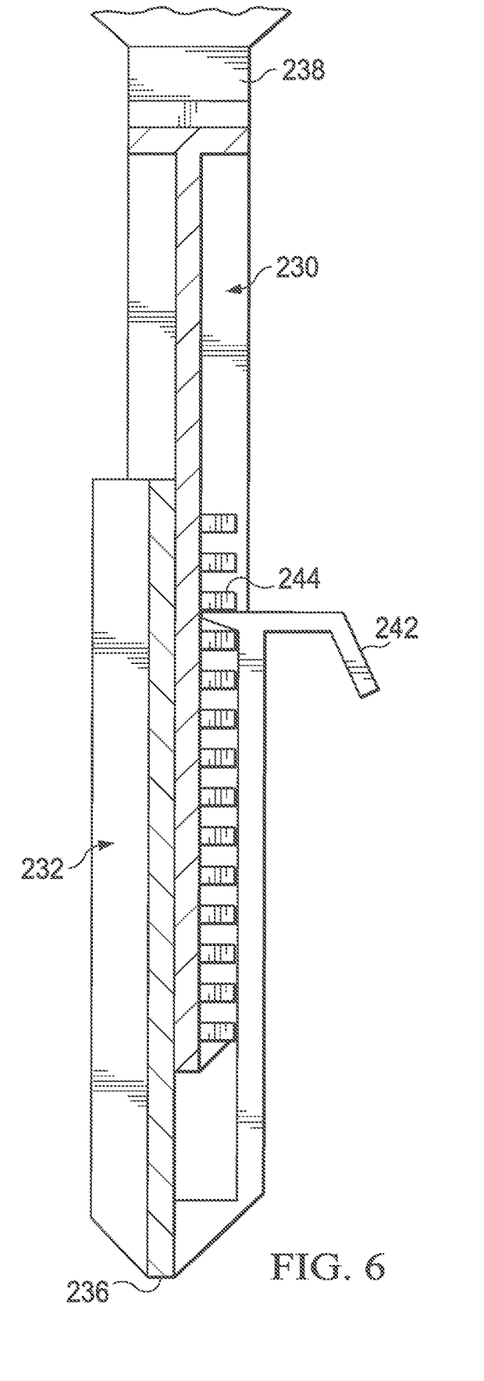

FIGS. 5 and 6 are drawings showing an enlarged view of an example mechanism to fix an adjustable length of a wall of an example divider, according to teachings of the present disclosure. The mechanism may include a set of detents 244 on one of the sections of the wall and a tooth 242 on the opposite section of the wall, configured to fit with the set of detents 244 to fix the length of the wall. The set of detents 244 may be disposed on either the primary section of the wall or the secondary section, and the tooth 242 vice versa.

Various additional features and/or components may be included to provide stability between the two sections of the wall as they slide along one another. For example, one section of the wall may include a T-groove 238 configured to limit the lateral movement of the other section of the wall having a component sliding within the T-groove. The mechanism may include snap-lock features like pawls 234 that allow sliding contact along the longitudinal axis of the divider 230 but restrict separation transverse to that axis.

Persons having ordinary skill in the art will be able to embody these teachings in various physical configurations and components without departing from the scope and spirit of the teachings within.

What is claimed is:

1. A divider for use with a junction box in circuit wiring, the divider comprising:
   a wall extending from one corner of a container of the junction box diagonally to an opposite corner of the container, the wall separating two generally triangular sections of the container; and
   a fitting for a connecting module having terminals on both a first side and a second side of the connecting module;
   wherein the first side of the connecting module extends into a first section of the container and the second side of the connecting module extends into the second section of the container.

2. A divider according to claim 1, wherein the wall has a height matching a depth of the container.

3. A divider according to claim 1, wherein the wall includes beveled ends fitting inside the corners of the container.

4. A divider according to claim 1, wherein the fitting comprises:
   a groove guiding the connecting module into a position;
   a stop defining the position of the connecting module; and
   a detent retaining the connecting module in the position once inserted.

5. An insert for a junction box, the insert comprising:
   a connecting module with terminals for a Class 2 circuit on a first side and for a line voltage circuit on a second side;
   the connecting module mounted into a divider comprising:
   a wall extending from one corner of a container of the junction box diagonally to an opposite corner of the container, the wall separating two generally triangular sections of the container; and
   a fitting for the module;
   wherein the first side of the connecting module extends into a first section of the container and the second side of the connecting module extends into the second section of the container.

6. An insert according to claim 5, wherein the wall has a height matching a depth of the container.

7. An insert according to claim 5, wherein the wall includes beveled ends fitting inside the corners of the container.

8. An insert according to claim 5, wherein the fitting comprises:
   a groove guiding the module into a position;
   a stop defining the position of the module; and
   a detent retaining the module in the position once inserted.

9. An insert according to claim 5, wherein the Class 2 circuit complies with the KNX standard network communications protocol.

10. A junction box for electrical circuits, the junction box comprising:
    a container with multiple mounts for electrical conduit or wiring;
    a connecting module with terminals for a Class 2 circuit on a first side and for a line voltage circuit on a second side;
    the connecting module mounted into a divider comprising:
    a wall extending from one corner of the container diagonally to an opposite corner of the container, the wall defining two generally triangular sections of the container; and
    a fitting for the module;
    wherein the first side of the connecting module extends into a first section of the container and the second side of the connecting module extends into the second section of the container.

11. A junction box according to claim 10, wherein the wall has a height matching a depth of the container.

12. A junction box according to claim 10, wherein the fitting comprises:
    a groove guiding the connecting module into a position;
    a stop defining the position of the connecting module; and
    a detent retaining the connecting module in the position once inserted.

13. A junction box according to claim 10, wherein the Class 2 circuit complies with the KNX standard network communications protocol.

* * * * *